United States Patent
Yamamoto (10) Patent No.: US 9,109,735 B2
(45) Date of Patent: Aug. 18, 2015

(54) PIPE JOINING STRUCTURE

(75) Inventor: Junichiro Yamamoto, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 427 days.

(21) Appl. No.: 13/508,760

(22) PCT Filed: Nov. 12, 2010

(86) PCT No.: PCT/JP2010/070641
§ 371 (c)(1),
(2), (4) Date: May 9, 2012

(87) PCT Pub. No.: WO2011/062250
PCT Pub. Date: May 26, 2011

(65) Prior Publication Data
US 2012/0223519 A1    Sep. 6, 2012

(30) Foreign Application Priority Data
Nov. 19, 2009    (JP) .................................. 2009-263688

(51) Int. Cl.
*F16L 41/00*    (2006.01)
*F16L 41/08*    (2006.01)
*F16L 37/00*    (2006.01)

(52) U.S. Cl.
CPC .............. *F16L 41/086* (2013.01); *F16L 37/008* (2013.01)

(58) Field of Classification Search
CPC .............................. F16L 37/008; F16L 41/086
USPC ............ 285/139.3, 139.2, 139.1, 142.1, 205, 285/194, 206, 207–210, 137.11, 124.3, 179
See application file for complete search history.

(56) References Cited

U.S. PATENT DOCUMENTS

| 3,001,804 A | * | 9/1961 | Tomlinson et al. ...... 285/137.11 |
| 5,853,201 A | * | 12/1998 | Izumi et al. .................... 285/179 |
| 7,032,500 B1 | * | 4/2006 | Sinclair et al. .................. 92/128 |

FOREIGN PATENT DOCUMENTS

| JP | U-60-167294 | 11/1982 |
| JP | U-62-068091 | 4/1987 |
| JP | A-07-305793 | 11/1995 |
| JP | A-10-332059 | 12/1998 |
| JP | A-2002-130561 | 5/2002 |
| JP | A-2003-106493 | 4/2003 |
| JP | A-2004-183674 | 7/2004 |

OTHER PUBLICATIONS

International Search Report mailed on Feb. 15, 2011 for the corresponding International patent application No. PCT/JP2010/070641.

* cited by examiner

*Primary Examiner* — Michael P Ferguson
*Assistant Examiner* — Jay R Ripley
(74) *Attorney, Agent, or Firm* — Posz Law Group, PLC (57) ABSTRACT

A pipe joining structure adapted to join a pipe to a fluid passage of an equipment housing. An end portion of a pipe is bent by about 90 degrees to form a bend portion and a tip of the bend portion is fitted into an opening of the fluid passage. The pipe joining structure includes a stay fitted over the bend portion of the pipe, a tip of the pipe is formed with a flange, and an O-ring fitted between the stay and the flange of the pipe. The tip of the pipe is joined to the equipment housing by fixing the stay to the equipment housing.

2 Claims, 6 Drawing Sheets

PIPE JOINING STRUCTURE

TECHNICAL FIELD

The present invention relates to a pipe joining structure. More specifically, the present invention relates to a pipe joining structure for coupling a pipe disposed to extend along a surface of an equipment housing which houses therein a transmission, an engine or the like, to an opening portion of a fluid passage of an equipment case.

BACKGROUND ART

In a transmission, for example, an oil pipe disposed to extend along a surface of a housing has an oil pipe end which is coupled to an opening portion of a fluid passage of the housing by means of a joint, as described in Japanese Patent Application Laid-open No. 2003-106493.

More specifically, the technique disclosed in this patent document is such that the pipe is joined to the fluid passage of the housing by attaching an eyejoint to an end portion of the pipe and then coupling the eyejoint to the opening portion of the fluid passage of the housing by means of an eyebolt.

The pipe joining structure disclosed in the patent document noted above, however, requires two washers in addition to the eye joint and eyebolt and hence requires an increased parts count, which results in an increased parts cost as well as an increased number of management items due to an increased number of seal portions.

DISCLOSURE OF THE INVENTION

The present invention has been made with the above-described actual condition of the background art in view. An object of the present invention is to provide a pipe joining structure which allows the parts cost to be reduced while requiring a reduced number of seal portions.

In order to accomplish the above-described object, the present invention provides a first pipe joining structure for joining a pipe disposed to extend along an equipment housing to a fluid passage of the equipment housing by bending an end portion of the pipe about 90 degrees to form a bend portion and fitting a tip of the bend portion into an opening of the fluid passage, characterized in that: a stay is fitted over the bend portion of the pipe; a tip of the pipe is formed with a flange; an O-ring is fitted between the stay and the flange of the pipe; and the stay is fixed to the equipment housing, to thereby join the tip of the pipe to the equipment housing.

The first pipe joining structure according to the present invention may have an arrangement wherein the bend portion of the pipe is formed with two spools, while the stay is held between the spools.

In order to accomplish the above-described object, the present invention provides a second pipe joining structure for joining a pipe disposed to extend along an equipment housing to a fluid passage of the equipment housing by bending an end portion of the pipe about 90 degrees to form a bend portion and fitting a tip of the bend portion into an opening of the fluid passage, characterized in that: a stay is provided which has a central portion formed with a tubular projecting portion having a tip formed with a flange and an intermediate portion formed with a spool; a tip of the pipe is fitted into and fixed to a pipe insert hole of the tubular projecting portion of the stay; an O-ring is fitted between the flange and the spool of the stay; the tubular projecting portion of the stay is fitted into the fluid passage of the equipment housing; and the stay is fixed to the equipment housing, to thereby join the tip of the pipe to the equipment housing.

In order to accomplish the above-described object, the present invention provides a third pipe joining structure for joining a pipe disposed to extend along an equipment housing to a fluid passage of the equipment housing by bending an end portion of the pipe about 90 degrees to form a bend portion and fitting a tip of the bend portion into an opening of the fluid passage, characterized in that: a stay is provided which has a central portion formed with a tubular projecting portion having an intermediate portion formed with a spool; a tip of the pipe is fitted into and fixed to a pipe insert hole of the tubular projecting portion of the stay; an O-ring is fitted between the spool formed on the tubular projecting portion of the stay and a base portion of the tubular projecting portion; the tubular projecting portion of the stay is fitted into the fluid passage of the equipment housing; and the stay is fixed to the equipment housing, to thereby join the tip of the pipe to the equipment housing.

In order to accomplish the above-described object, the present invention provides a fourth pipe joining structure for joining a pipe disposed to extend along an equipment housing to a fluid passage of the equipment housing by bending an end portion of the pipe about 90 degrees to form a bend portion and fitting a tip of the bend portion into an opening of the fluid passage, characterized in that: a joint is fixed to the tip of the bend portion while being locked by a stay; an O-ring is fitted over a peripheral surface of the joint; and the stay is fixed to the equipment housing, to thereby join a tip of the pipe to the equipment housing.

In order to accomplish the above-described object, the present invention provides a fifth pipe joining structure for joining a pipe disposed to extend along an equipment housing to a fluid passage of the equipment housing by bending an end portion of the pipe about 90 degrees to form a bend portion and fitting a tip of the bend portion into an opening of the fluid passage, characterized in that: a joint is fixed to the tip of the bend portion; an O-ring is fitted over a peripheral surface of the joint; and the joint is locked onto the equipment housing by means of a one-touch type retainer, to thereby join a tip of the pipe to the equipment housing.

With the first to fifth pipe joining structures according to the present invention each having an arrangement wherein the end portion of the pipe is bent to form the bend portion having a tip fitted into the opening of the fluid passage of the equipment housing, while the O-ring provides a seal between the outer periphery of the pipe fitted into the fluid passage and the inner periphery of the fluid passage, it is possible to realize compact pipe joining with a lower parts count by minimum right angle bending of the pipe and reduce the number of seal portions, thereby to make management easy. Further, easy pipe joining becomes possible because the O-ring for sealing is positioned in place with less possibility of its falloff by being fitted between the flange formed at the tip of the pipe and the stay or between the flange formed at the tip of the pipe and the spool or by being fitted over the peripheral surface of the joint fixed to the tip of the pipe or otherwise.

BEST MODE FOR CARRYING OUT THE INVENTION

Hereinafter, embodiments of pipe joining structures according to the present invention will be described in detail with reference to the drawings.

Figure 1:
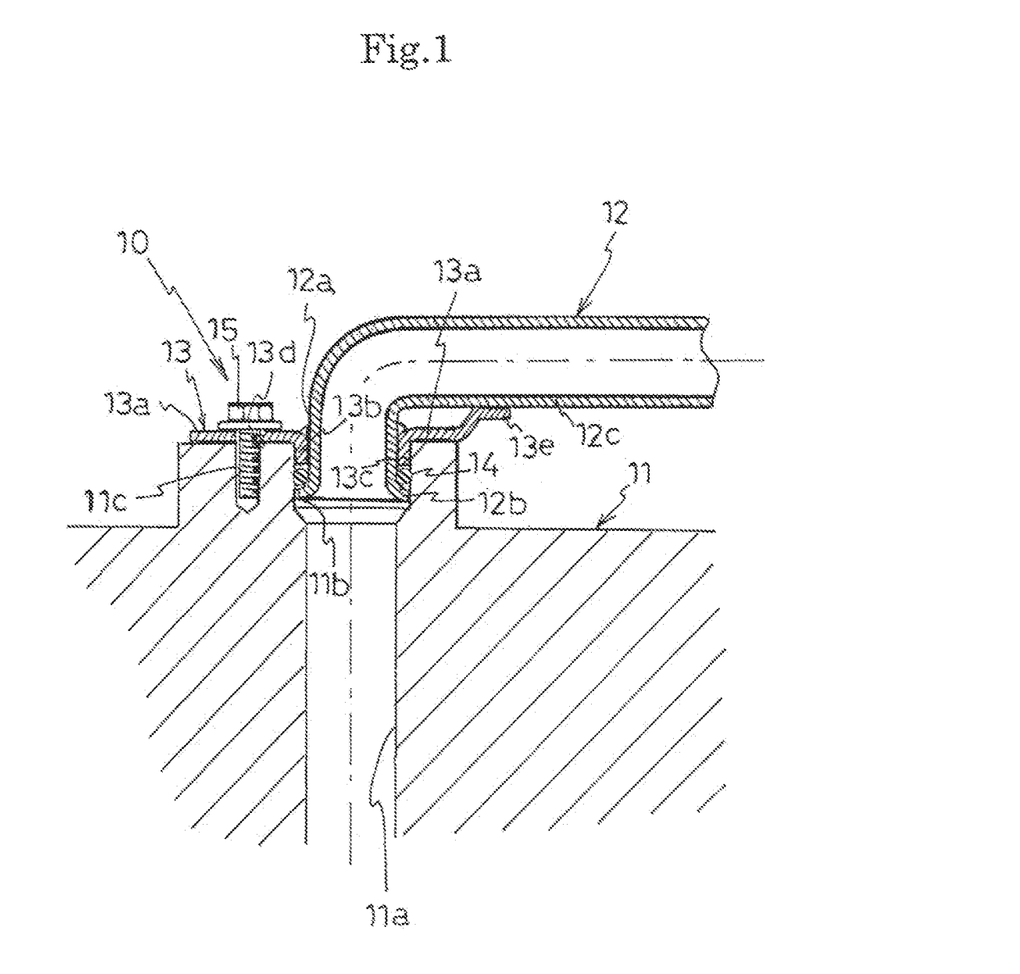
FIG. 1 is a sectional view illustrating one embodiment of a pipe joining structure according to the present invention.

In a pipe joining structure 10 illustrated in FIG. 1, a fluid passage 11a formed in an equipment housing 11 which houses therein a clutch, an engine or the like has an opening portion formed with a spot-faced hole 11b. An opening peripheral edge around the spot-faced hole 11b is formed with a female thread hole 11c.

A pipe 12 disposed to extend along a surface of the equipment housing 11 has an end portion which is bent about 90 degrees by minimum right angle bending to form a bend portion 12a. The tip of the bend portion 12a is formed with a flange 12b by curling or the like.

The pipe joining structure 10 has a stay 13. The stay 13 comprises a sheet member 13a having a central portion which is formed with a pipe insert hole 13c having a tubular projecting portion 13b formed by burring or the like. A screw insert hole 13d is formed between the pipe insert hole 13c and a peripheral edge. The sheet member 13a is partially formed with a tongue-like piece 13e which is bent like a crank to extend in the opposite direction away from the tubular projecting portion 13b. With the pipe insert hole 13c of the stay 13 being fitted over the bend portion 12a of the pipe 12, the tubular projecting portion 13b and the tongue-like piece 13e are fixed to the bend portion 12a and a straight pipe portion 12c, respectively, of the pipe 12 by brazing or the like.

The fixing between the tubular projecting portion 13b and the bend portion 12a of the pipe 12 and the fixing between the tongue-like piece 13e and the straight pipe portion 12c of the pipe 12 are not necessarily required. However, such fixing therebetween allows the stay 13 to be easily positioned relative to the pipe 12 while facilitating the fitting operation on the equipment housing 11.

In the pipe joining structure 10, the bend portion 12a of the pipe 12 is fitted into the spot-faced hole 11b of the equipment housing 11 with an O-ring 14 fitted between the flange 12b of the bend portion 12a of the pipe 12 and the tip of the tubular projecting portion 13b of the stay 13. Thereafter, a screw 15 is inserted into the screw insert hole 13d of the stay 13 and then the tip of the screw 15 is threadingly engaged with the female thread hole 11c of the equipment housing 11 to fasten the pipe 12 to the equipment housing 11.

The pipe joining structure 10 thus assembled restrains the O-ring 14 between the flange 12b of the pipe 12 and the tubular projecting portion 13b of the stay 13 to provide a seal between the peripheral surface of the pipe 12 and the spot-faced hole 11b of the equipment housing 11. Further, the pipe 12 is joined to the equipment housing 11 by means of the stay 13.

Figure 2:
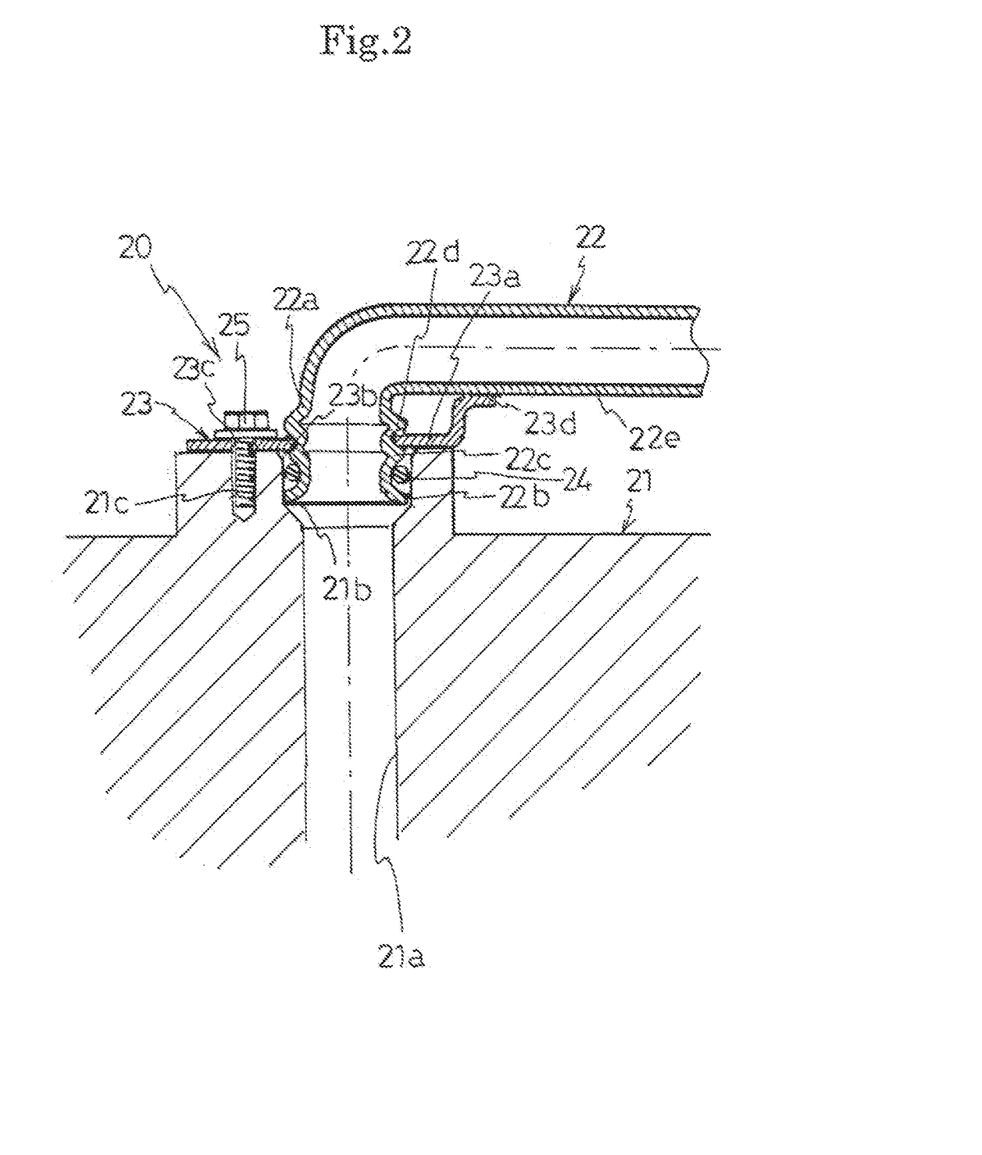
FIG. 2 is a sectional view illustrating a variation of the pipe joining structure shown in FIG. 1.

In a pipe joining structure 20 illustrated in FIG. 2, a fluid passage 21a formed in an equipment housing 21 has an opening portion formed with a spot-faced hole 21b. An opening peripheral edge around the spot-faced hole 21b is formed with a female thread hole 21c.

A pipe 22 disposed to extend along a surface of the equipment housing 21 has an end portion which is bent about 90 degrees by minimum right angle bending to form a bend portion 22a. The tip of the bend portion 22a is formed with a flange 22b by curling or the like. The pipe 22 is further formed with spools 22c and 22d at an intermediate portion of the bend portion 22a. These spools 22c and 22d are provided for holding therebetween a stay 23 to be described later and are formed by end forming after the stay 23 has been fitted over the bend portion 22a of the pipe 22.

The stay 23 comprises a substantially circular sheet member 23a having a central portion which is formed with a pipe insert hole 23b. A screw insert hole 23c is formed between the pipe insert hole 23b and a peripheral edge. A tongue-like piece 23d extends from a part of the sheet member 23a and is bent upwardly like a crank.

With the pipe insert hole 23b of the stay 23 being fitted over the bend portion 22a of the pipe 22, the spools 22c and 22d are formed by end forming to sandwich the sheet member 23a of the stay 23 therebetween. The peripheral edge portion of the pipe insert hole 23b and the tongue-like piece 23d are fixed to between the spools 22c and 22d of the pipe 22 and to a straight pipe portion 22e of the pipe 22, respectively, by brazing or the like.

The fixing between the peripheral edge portion of the pipe insert hole 23b and the spools 22c and 22d of the pipe 22 and the fixing between the tongue-like piece 23d and the straight pipe portion 22e of the pipe 22 are not necessarily required. However, such fixing therebetween allows the stay 23 to be easily positioned relative to the pipe 22 while facilitating the fitting operation on the equipment housing 21.

Subsequently, an O-ring 24 is fitted between the flange 22b and the spool 22c and then the tip of the bend portion 22a of the pipe 22 is fitted into the spot-faced hole 21b of the equipment housing 21. Thereafter, a screw 25 is inserted into the screw insert hole 23c of the stay 23 and then the tip of the screw 15 is threadingly engaged with the female thread hole 21c of the equipment housing 21 to fasten the pipe 22 to the equipment housing 21.

The pipe joining structure 20 thus assembled restrains the O-ring 24 between the flange 22b and the spool 22c of the pipe 22 to provide a seal between the peripheral surface of the pipe 22 and the spot-faced hole 21b of the equipment housing 21. Since the spools 22c and 22d of the pipe 22 are engaged by the stay 23, the pipe 22 is joined to the equipment housing 21 by means of the stay 23.

Figure 3:
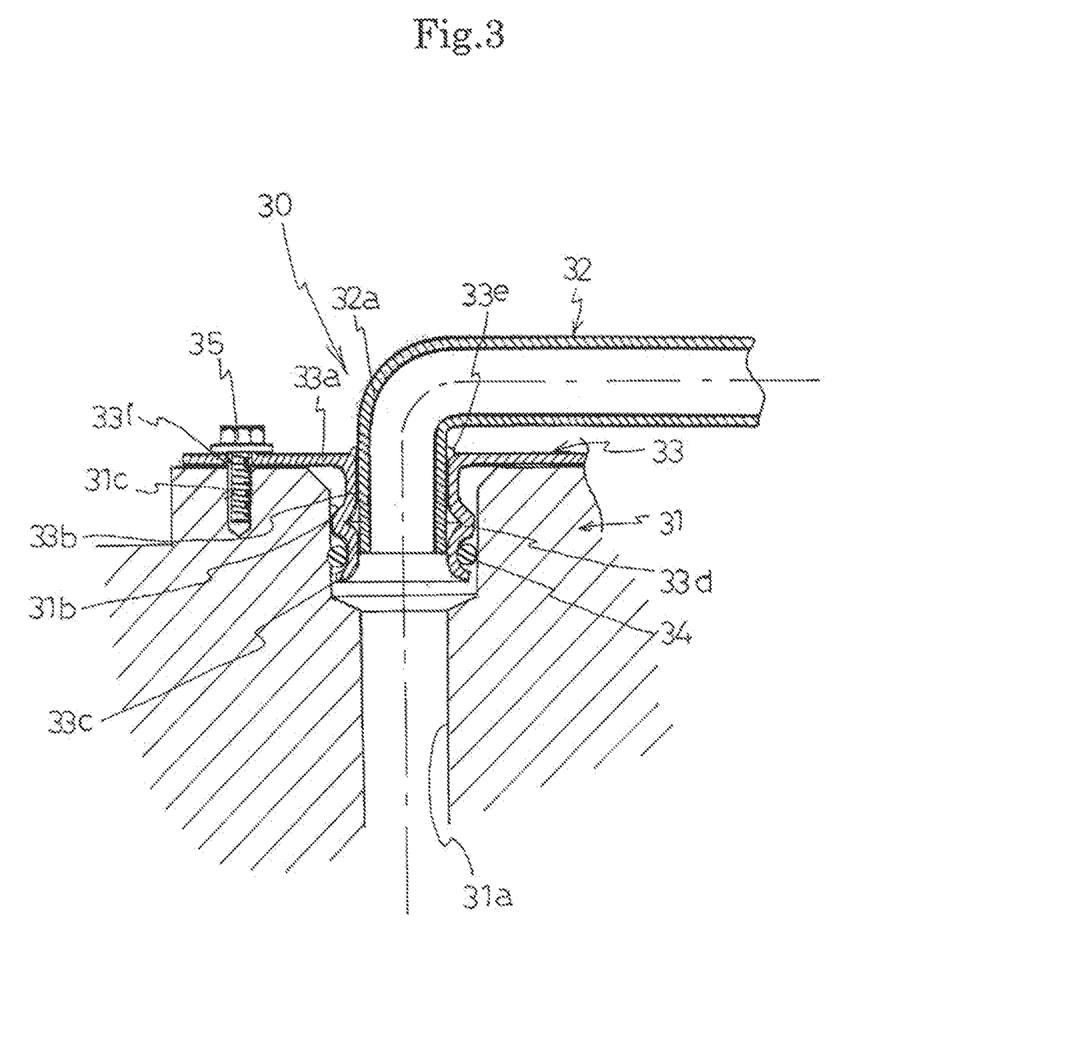
FIG. 3 is a sectional view illustrating another embodiment of a pipe joining structure according to the present invention.

In a pipe joining structure 30 illustrated in FIG. 3, a fluid passage 31a formed in an equipment housing 31 has an opening portion formed with a spot-faced hole 31b. An opening peripheral edge around the spot-faced hole 31b is formed with a female thread hole 31c.

A pipe 32 disposed to extend along a surface of the equipment housing 31 has an end portion which is bent about 90 degrees by minimum right angle bending.

The pipe joining structure 30 has a stay 33. The stay 33 comprises a sheet member 33a having a central portion which is formed with a tubular projecting portion 33b by burring or the like. The tubular projecting portion 33b has a tip formed with a flange 33c and an intermediate portion formed with a spool 33d. A screw insert hole 33f is formed between a pipe insert hole 33e defined by the tubular projecting portion 33b and a peripheral edge. The tubular projecting portion 33b of the stay 33 is fixed to a bend portion 32a of the pipe 32 by brazing or the like.

In the pipe joining structure 30, the tubular projecting portion 33b of the stay 33 is fitted into the spot-faced hole 31b of the equipment housing 31 with an O-ring 34 fitted between the flange 33c and the spool 33d of the tubular projecting portion 33b of the stay 33. Thereafter, a screw 35 is inserted into the screw insert hole 33f of the stay 33 and then the tip of the screw 35 is threadingly engaged with the female thread hole 31c of the equipment housing 31 to fasten the pipe 32 to the equipment housing 31.

The pipe joining structure 30 thus assembled restrains the O-ring 34 between the flange 33c and the spool 33d of the stay 33 to provide a seal between the tubular projecting portion 33b of the stay 33 and the spot-faced hole 31b of the equipment housing 31. Then, the pipe 32 is joined to the equipment housing 31 by means of the stay 33.

Figure 4:
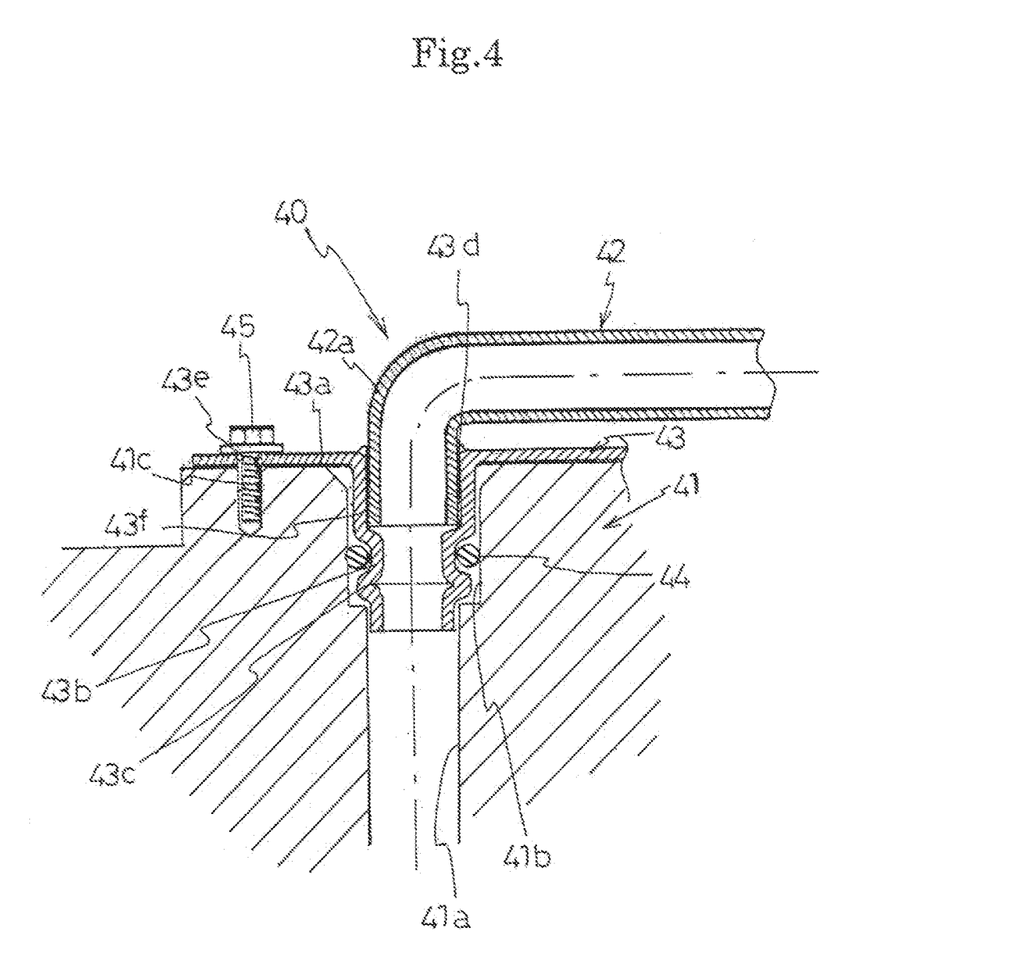
FIG. 4 is a sectional view illustrating a variation of the pipe joining structure shown in FIG. 3.

In a pipe joining structure 40 illustrated in FIG. 4, a fluid passage 41a formed in an equipment housing 41 has an opening portion formed with a spot-faced hole 41b. An opening peripheral edge around the spot-faced hole 41b is formed with a female thread hole 41c.

A pipe 42 disposed to extend along a surface of the equipment housing 41 has an end portion which is bent about 90 degrees by minimum right angle bending.

The pipe joining structure 40 has a stay 43. The stay 43 comprises a sheet member 43a having a central portion which is formed with a tubular projecting portion 43b by burring or the like. The tubular projecting portion 43b has a tip portion formed with a spool 43c. A screw insert hole 43e is formed between a pipe insert hole 43d defined by the tubular projecting portion 43b and a peripheral edge. The tubular projecting portion 43b of the stay 43 is fixed to a bend portion 42a of the pipe 42 by brazing or the like.

In the pipe joining structure 40, the tubular projecting portion 43b of the stay 43 is fitted into the spot-faced hole 41b of the equipment housing 41 with an O-ring 44 fitted between the spool 43c of the tubular projecting portion 43b of the stay 43 and a base portion 43f of the tubular projecting portion 43b. A screw 45 is inserted into the screw insert hole 43e of the stay 43 and then the tip of the screw 45 is threadingly engaged with the female thread hole 41c of the equipment housing 41 to fasten the pipe 42 to the equipment housing 41.

The pipe joining structure 40 thus assembled restrains the O-ring 44 between the spool 43c and the base portion 43f of the stay 43 to provide a seal between the tubular projecting portion 43b of the stay 43 and the spot-faced hole 41b of the equipment housing 41. Then, the pipe 42 is joined to the equipment housing 41 by means of the stay 43.

Figure 5:
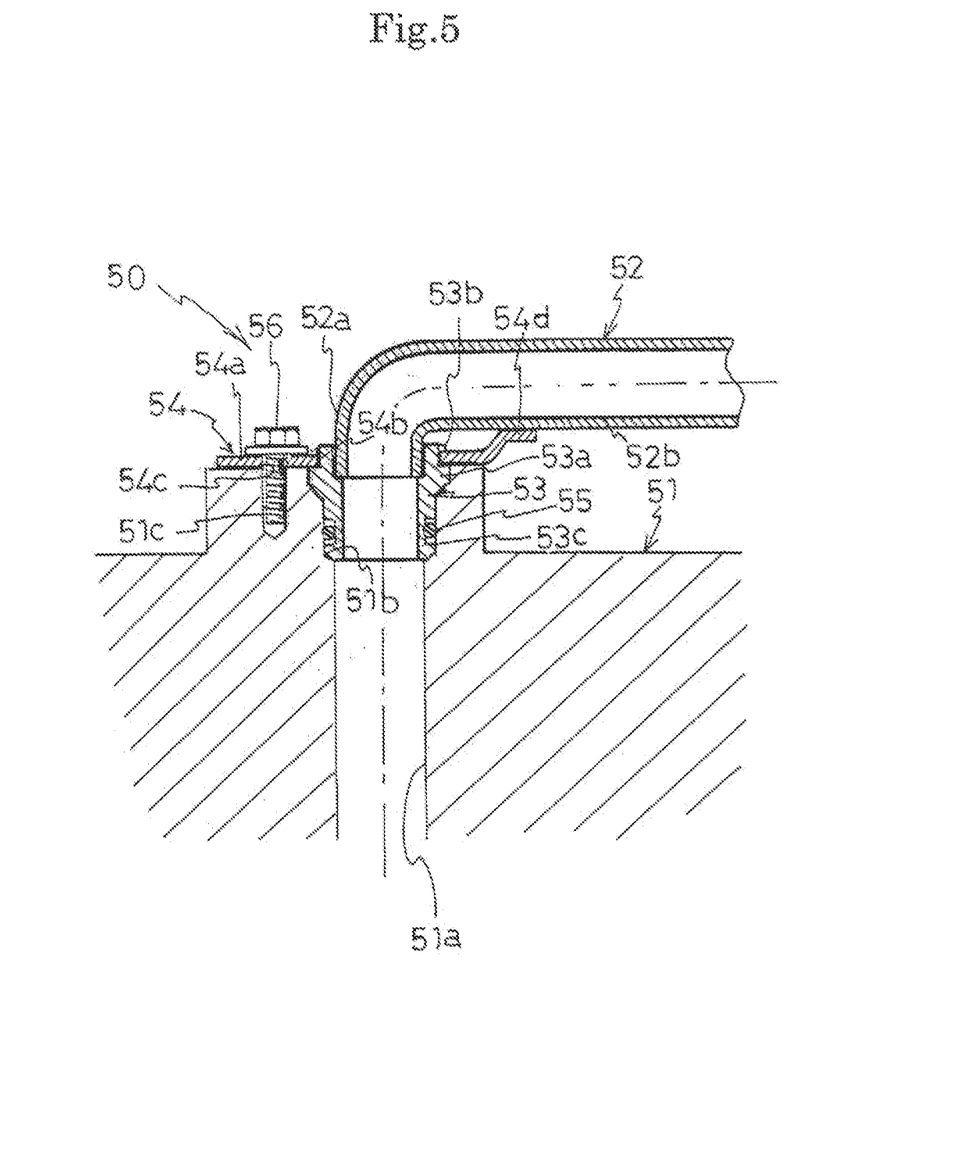
FIG. 5 is a sectional view illustrating yet another embodiment of a pipe joining structure according to the present invention.

In a pipe joining structure 50 illustrated in FIG. 5, a fluid passage 51a formed in an equipment housing 51 has an opening portion formed with a spot-faced hole 5b. An opening peripheral edge around the spot-faced hole 51b is formed with a female thread hole 51c.

A pipe 52 disposed to extend along a surface of the equipment housing 51 has an end portion which is bent about 90 degrees by minimum right angle bending to form a bend portion 52a. The tip of the bend portion 52a is fitted with a joint 53. The joint 53 has an intermediate portion provided with a flange-shaped portion 53a, a base end peripheral edge formed with an annular notch 53b, and a tip peripheral surface formed with an annular recess 53c.

The pipe joining structure 50 has a stay 54. The stay 54 comprises a sheet member 54a having a central portion which is formed with a joint insert hole 54b. A screw insert hole 54c is formed between the joint insert hole 54b and a peripheral edge. A tongue-like piece 54d extends from a part of the sheet member 54a and is bent upwardly like a crank.

In the pipe joining structure 50, with the joint insert hole 54b of the stay 54 being fitted over the annular notch 53b of the joint 53, an opening portion of the joint 53 is fitted over and brazed to the tip of the bend portion 52a of the pipe 52, while a peripheral edge portion of the joint insert hole 54b and the tongue-like piece 54d are fixed to the annular notch 53b of the joint 53 and a straight pipe portion 52b of the pipe 52, respectively, by brazing or the like.

The fixing between the peripheral edge portion of the joint insert hole 54b of the stay 54 and the annular notch 53b of the joint 53 and the fixing between the tongue-like piece 54d and the straight pipe portion 52b of the pipe 52 are not necessarily required. However, such fixing therebetween allows the stay 54 to be easily positioned relative to the pipe 52 while facilitating the fitting operation on the equipment housing 51.

Subsequently, an O-ring 55 is fitted over the annular recess 53c of the joint 53 and then the tip of the joint 53 is fitted into the spot-faced hole 51b of the equipment housing 51. Thereafter, a screw 56 is inserted into the screw insert hole 54c of the stay 54 and then the tip of the screw 56 is threadingly engaged with the female thread hole 51c of the equipment housing 51 to fasten the pipe 52 to the equipment housing 51.

The pipe joining structure 50 thus assembled restrains the O-ring 55 in the annular recess 53c of the joint 53 to make the O-ring 55 abut against the internal surface of the spot-faced hole 51b of the equipment housing 51, thereby providing a seal between the joint 53 and the equipment housing 51. Further, the pipe 52 is joined to the equipment housing 51 via the joint 53 by means of the stay 54.

Figure 6:
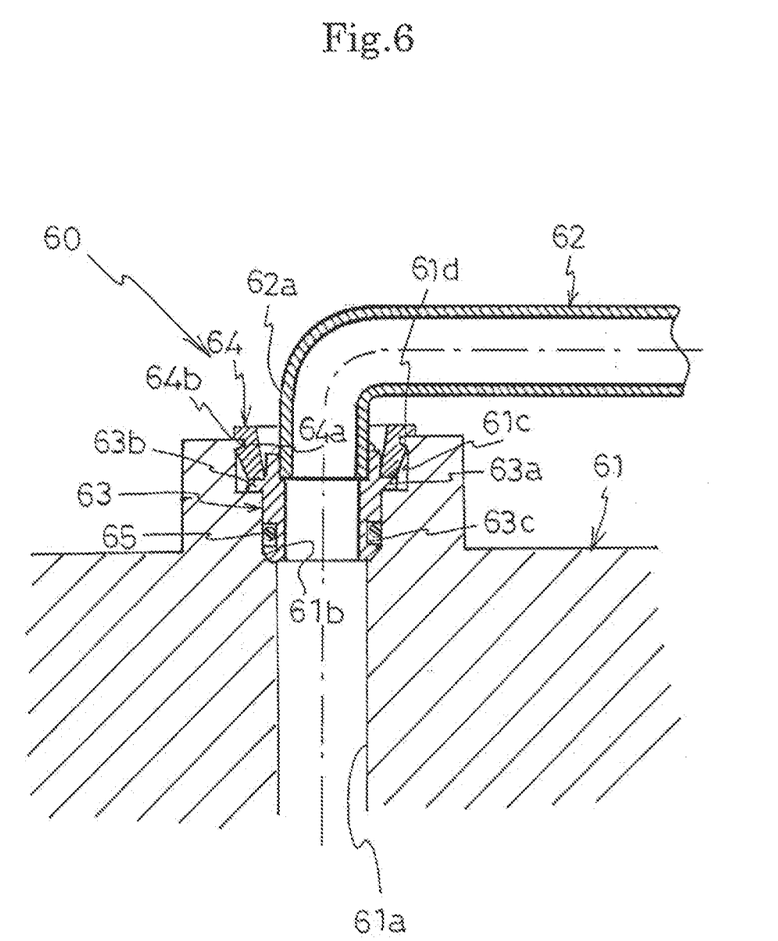
FIG. 6 is a sectional view illustrating a variation of the pipe joining structure shown in FIG. 5.

In a pipe joining structure 60 illustrated in FIG. 6, a fluid passage 61a formed in an equipment housing 61 has an opening portion formed with a spot-faced hole 61b. The opening of the spot-faced hole 61b is formed with a larger-diameter recess 61c. The recess 61c has an opening peripheral edge formed with a flange 61d.

A pipe 62 disposed to extend along a surface of the equipment housing 61 has an end portion which is bent about 90 degrees by minimum right angle bending to form a bend portion 62a. The tip of the bend portion 62a is fitted with a joint 63.

The joint 63 has an intermediate portion provided with a flange-shaped portion 63a, a base end peripheral edge formed with an annular notch 63b, and a tip peripheral surface formed with an annular recess 63c.

The pipe joining structure 60 has a one-touch type retainer 64. The retainer 64 is in the form of a truncated cone and is provided with elastic pieces 64a at suitable places on the peripheral surface of the retainer 64, for example, at two opposite places. Each of the elastic pieces 64a has an outer peripheral surface formed with a recess 64b.

In the pipe joining structure 60, an opening portion of the joint 63 is fitted over and brazed to the tip of the bend portion 62a of the pipe 62. Subsequently, an O-ring 65 is fitted over the annular recess 63c of the joint 63 and then the tip of the joint 63 is fitted into the spot-faced hole 61b of the equipment housing 61. Thereafter, the one-touch type retainer 64 is forced into the recess 61c of the equipment housing 61 against the biasing force of the elastic pieces 64a and then the annular recess 64b is brought into engagement with the flange 61d of the equipment housing 61 with the tip of the joint 63 abutted against the flange-shaped portion 63a.

The pipe joining structure 60 thus assembled restrains the O-ring 65 in the annular recess 63c of the joint 63 to make the O-ring 55 abut against the internal surface of the spot-faced hole 61b of the equipment housing 61, thereby providing a seal between the joint 63 and the equipment housing 61. Further, the pipe 62 is joined to the equipment housing 61 very easily by means of the one-touch type retainer 64.

While the embodiments of the pipe joining structures according to the present invention have been described above, the present invention is in no way limited to the embodiments described above. It is obvious that various variations and modifications are possible within the scope of the technical concept of the present invention defined by the claims.

INDUSTRIAL APPLICABILITY

With the pipe joining structures according to the present invention each having an arrangement wherein the end portion of the pipe is bent to form the bend portion having a tip fitted into the opening of the fluid passage of the equipment housing, while the O-ring provides a seal between the outer periphery of the pipe fitted into the fluid passage and the inner periphery of the fluid passage of the equipment housing, it is possible to realize compact pipe joining with a lower parts count by minimum right angle bending of the pipe and reduce the number of seal portions, thereby to make management easy. Further, easy pipe joining becomes possible because the O-ring for sealing is positioned in place with less possibility of its falloff by being fitted between the flange formed at the tip of the pipe and the stay or between the flange formed at the tip of the pipe and the spool or by being fitted over the peripheral surface of the joint fixed to the tip of the pipe or otherwise. Therefore, the pipe joining structure can be advantageously utilized to couple a pipe disposed to extend along a surface of an equipment housing which houses there in a transmission, an engine or the like, to an opening portion of a fluid passage of an equipment case.

The invention claimed is:

1. A pipe joining structure joining a pipe disposed to extend along an equipment housing to a fluid passage of the equipment housing, the pipe formed by bending an end portion of the pipe about 90 degrees to form a bend portion having a tip and a straight portion, the joining structure comprises:
 a tubular member having an upper end with an opening, a lower end, an outer side, and an annular notch extending around the upper end of the tubular member and on the outer side of the tubular member, the tubular member further having an annular recess extending around the lower end and on the outer side of the tubular member;
 an O-ring is arranged in the annular recess of the tubular member;
 a stay having a sheet member with a thin and flat shape, the sheet member including a middle portion with a joint insert hole and a peripheral portion with a screw insert hole for fixing the stay to the equipment housing, and a tongue piece being bent and extending upwardly from the middle portion and positioned substantially opposite the screw insert hole, and the annular notch of the tubular member fitting into the joint insert hole of the sheet member,
wherein:
 the tip of the bend portion of the pipe is inserted into an interior of the opening of the tubular member;
 the joint insert hole of the sheet member of the stay is fixed to the annular notch of the tubular member,
 the lower end of the tubular member is inserted into a spot-faced hole of the opening of the fluid passage of the equipment housing, thereby connecting the tip of the pipe to the equipment housing,
 the sheet member is fixed to the equipment housing at a location outside of the spot-faced hole using the screw insert hole in the sheet member, and
 the tongue piece of the stay is fixed to a straight portion of the pipe.

2. A pipe joining structure joining pipes and fluid passages of equipment housings, comprising:
 an equipment housing having a fluid passage terminating with an opening comprising a spot-faced hole coaxially arranged with the fluid passage, the spot-faced hole having a diameter greater than inner portions of the fluid passage;
 a pipe extending along the equipment housing, the pipe having a bend portion including a bend of about 90 degrees, the bend portion of the pipe having a tip for connecting to the opening of the fluid passage of the housing equipment housing;
 a tubular member having an upper end with an opening, a lower end, an outer side, an annular recess extending around the lower end and on the outer side of the tubular member, and an annular notch extending around the upper end of the tubular member and on the outer side of the tubular member;
 an O-ring arranged in the annual recess of the tubular member;
 a stay having a sheet member having a thin and flat shape extending outwardly and radially from the upper end of the tubular member, the sheet member including:
  a width greater than a width of the spot-faced hole of the fluid passage,
  a peripheral portion with a screw insert hole for fixing the stay to the equipment housing and a tongue piece substantially opposite the screw insert hole that is bent and extends upwardly, and
  a pipe receiving hole arranged in a central portion of the sheet member about the annular notch of the tubular member,
wherein:
 the tip of the pipe is fitted within an interior of the tubular member,
 the lower end of the tubular member is fitted into the spot-faced hole of the opening of the fluid passage of the equipment housing,
 the sheet member is fixed to the equipment housing at a location outside of the spot-faced hole using the screw insert hole in the sheet member, and
 the tongue piece of the sheet member is fixed to a straight portion of the pipe.

* * * * *